(12) United States Patent
Buckley

(10) Patent No.: US 6,429,796 B1
(45) Date of Patent: Aug. 6, 2002

(54) METHOD AND DEVICE FOR SPECTRALLY PURE, PROGRAMMABLE SIGNAL GENERATION

(75) Inventor: Robert M. Buckley, Medford, NY (US)

(73) Assignee: Advanced Testing Technologies Inc., Hauppauge, NY (US)

( * ) Notice: Subject to any disclaimer, the term of this patent is extended or adjusted under 35 U.S.C. 154(b) by 34 days.

(21) Appl. No.: 09/616,235

(22) Filed: Jul. 14, 2000

Related U.S. Application Data

(60) Provisional application No. 60/144,656, filed on Jul. 16, 1999.

(51) Int. Cl.[7] .......................... H03M 1/10; H03B 21/00
(52) U.S. Cl. ........................................ 341/120; 327/106
(58) Field of Search ................................ 341/120, 144; 364/484; 327/106, 105; 702/107

(56) References Cited

U.S. PATENT DOCUMENTS

| | | | |
|---|---|---|---|
| 5,220,523 A | | 6/1993 | Yoshida et al. ............. 364/718 |
| 5,428,308 A | * | 6/1995 | Maeda ....................... 327/106 |
| 5,719,782 A | * | 2/1998 | Mitsuoka .................... 364/484 |
| 5,898,325 A | * | 4/1999 | Crook et al. ................. 327/105 |
| 6,131,073 A | * | 10/2000 | Honda et al. ................ 702/107 |

* cited by examiner

*Primary Examiner*—Peguy Jeanpierre
*Assistant Examiner*—Joseph Lauture
(74) *Attorney, Agent, or Firm*—Brian Roffe

(57) ABSTRACT

A method for generating a waveform at a particular frequency in which a segment RAM depth is determined based on the relationship between the frequency and a variable clock value, a RAM based memory system is provided with waveform information, and the waveform is sequentially generated from a combination of the waveform information in the RAM based memory system from a first memory site to a memory site dependent on the segment RAM depth. The generated waveform is filtered to obtain only the waveform at the desired frequency. The RAM based memory system is provided with the waveform information by dividing each desired waveform into segments depending on the clock value and storing each segment in a respective memory site. An analog to digital converter may be evaluated by directing the desired waveform to the analog to digital converter. The generated waveform is tuned in the filter to a center frequency if it is a sinewave or a tuned squarewave.

26 Claims, 6 Drawing Sheets

METHOD AND DEVICE FOR SPECTRALLY PURE, PROGRAMMABLE SIGNAL GENERATION

CROSS-REFERENCE TO RELATED APPLICATION

This application claims priority under 35 U.S.C. §119(e) of U.S. provisional patent application Ser. No. 60/144,656 filed Jul. 16, 1999.

FIELD OF THE INVENTION

The present invention relates to the field of automatic test equipment and simulation instrumentation for testing electronic devices, and more particularly, to automatic test equipment for generating programmable low noise, low spurious, spectrally pure signals in the frequency range of LF (low frequency 30–300 kHz) to HF (high frequency 3–30 MHz).

BACKGROUND OF THE INVENTION

Automatic test equipment for testing Analog to Digital Converting (ADC) devices is known. However, when the requirements of the ADC devices are such that low spurious, high dynamic range and high-speed conversion is required, then the current state of the art instrumentation in the automatic test equipment is inadequate to perform the required testing operations.

Fixed tuned oscillators meeting these requirements may be substituted for the automatic test equipment and may provide some test capability. However, only true programmable instrumentation can perform wide-band device evaluation.

Direct digital frequency synthesis (DDFS) is a known technique for generating a precisely-controlled, fast frequency switching, frequency accurate, radio frequency (R-F) output. There presently exist various narrow band DDFS integrated circuits that provide frequency and phase control with fractional Hertz and radian resolution, with reasonable spurious performance (−60 decibels below carrier (dBC)). Narrow band DDFS has applications in signal simulation. However, the application is limited due to the inherent narrow RF output bandwidth. Wide-band DDFS integrated circuits exist that provide frequency control only, but these circuits have comparatively poor spurious performance (−30 dBC).

With respect to prior art related to direct digital synthesizers, U.S. Pat. No. 5,789,950 (Nakagawa) describes a direct digital synthesizer capable of generating a desired frequency with small circuitry, low power consumption, and no spurious components. It includes an accumulator for accumulating a frequency control word for each pulse of a clock signal, a D/A converter for converting the accumulation value of the accumulator to an analog voltage, an integrator for smoothing the output of the D/A converter, a comparator for comparing the output of the integrator with a reference voltage, and for producing pulses at timings at which the output of the integrator reaches the reference voltage while the accumulation value of the accumulator is increasing, and a pulse generator for producing pulses in synchronism with the rising edges of the output of the comparator. The output pulses of the pulse generator constitute an output of the direct digital synthesizer.

With respect to prior signal generating devices and methods, early waveform generating devices usually employed a crystal oscillator as the waveform generating device for the system clock and this included a programmable frequency divider, counter, multiplexer, controller and digital-to-analog converter, as well as various devices and methods for generating a waveform by phase accumulation. Improvements in waveform generating devices include U.S. Pat. No. 5,446,760 (Bienz et al.) which describes a digital pulse shaping and phase modulation network for reducing out-of-band spectral energy. The network is used in conjunction with a numerically controlled oscillator. The modulator includes RAM memory having prestored values corresponding to a number of steps relating to changes in digital data inputs and is operated in response to counter outputs to transmit the prestored values. A phase accumulator is coupled to the RAM memory and continuously adds each transmitted prestored value to produce a digital accumulated phase angle.

U.S. Pat. No. 5,428,308 (Maeda) describes a direct digital synthesizer which generates signals having a relatively high frequency and includes a clock generator, a frequency setting circuit in which phase increment for unit clock can be programmed, a phase accumulator in which phase increment is accumulated, a ROM which outputs a digital signal corresponding to cumulative phase output and digital-to-analog converter which inverts polarity of output in each clock time and a band-pass filter.

U.S. Pat. No. 5,883,530 (Wu) describes methods and devices for generating cycled waveforms in which one or more digital waveform sampling values is/are filled into a table. Each sampling value is added/subtracted with a predetermined DC voltage level by an adder/subtracter to obtain a periodic digital value that is then converted into a desired analog waveform by a digital-to-analog converter.

Additional patents which describe other types of signal generators are U.S. Pat. No. 5,349,310 (Rieder et al.), U.S. Pat. No. 5,467,294 (Hu et al.), U.S. Pat. No. 5,519,343 (Britz), U.S. Pat. No. 5,631,586 (Sogo), U.S. Pat. No. 5,703,540 (Gazda et al.), U.S. Pat. No. 5,705,945 (Wee), U.S. Pat. No. 5,821,816 (Patterson), U.S. Pat. No. 5,898,325 (Crook et al.) and U.S. Pat. No. 6,066,967 (Cahill et al.). All of the foregoing patents are incorporated by reference herein in their entirety.

OBJECTS OF THE INVENTION

Accordingly, it is an object of the present invention to provide new and improved automatic test instrument for generating spectrally pure programmable signals.

It is another object of the present invention to provide new and improved automatic test equipment for testing ADCS.

It is yet another object of the invention to provide new and improved automatic test equipment capable of testing ADCs having low spurious, high dynamic range and high-speed conversion requirements.

It is another object of the present invention to provide new and improved devices and methods for generating signals, e.g., for testing ADCs, without using a phase accumulator.

SUMMARY OF THE INVENTION

In order to achieve the objects set forth above, and others, the automatic test equipment in accordance with the invention comprises a digital data processing (DDP) module that is preferably enclosed in a rack mountable IEEE488 programmable instrument. This module comprises the following major elements: a microprocessor controller, an interface controller, an 80 MHz Bias/DDS (direct digital synthesizer) CCA (circuit card assembly), an 80 MHz oven controlled crystal oscillator (OCXO), a target generator controller, a clock distribution, a target gain programmable filter/trigger, unique waveform software, and an amplifier interface.

In order to obtain the preferred low noise, low spurious, spectrally pure signals, a signal source as perfect as possible should be used. The fixed tuned OCXO has been found to be an exception signal source to obtain low spurious, spectrally pure signal. Other signal sources could be used in certain embodiments of the invention, although the quality of the output signals would likely be lower relative to the quality obtained using an OCXO. The device for generating a spectrally pure waveform of a desired frequency comprises an oven controlled crystal oscillator for generating a reference frequency signal, a waveforn memory containing data on the waveform, a segment determination circuit for creating segments of the waveform in the waveform memory based on the reference frequency signal and the desired frequency, a RAM memory for receiving and storing the segments of the waveform in dedicated address memories, a digital-to-analog converter for downloading the address memories of the RAM memory and forming analog signals, and a filtering component for filtering the analog signals to obtain the waveform of the desired frequency. Instead of the RAM memory, any type of programmable memory may be used. A clock generator/distributor is usually interposed between the oscillator and the waveform memory and segment determination circuit. An amplifier, preferably a linear amplification circuit, is arranged in association with the digital-to-analog converter for amplifing the analog signals. The filtering component might include one or more bandpass filters or one or more pre-selectors. The waveform memory includes data on sine waves, square waves and triangle waves, as well as other types of waveforms. The digital-to-analog converter is preferbaly a 16 bit BiCMOS.

The method for generating a waveform at a particular frequency in accordance with the invention which occurs in the target generator controller comprises the steps of providing a register (designated n) having a value of 0 and clock value of 20 MHz/$2^n$, determining whether the frequency times 4096 is less than or equal to the clock value, incrementing the register until the frequency times 4096 is less than or equal to the clock value, then assigning a segment RAM depth to be equal to the nearest, lower integer of the clock value or frequency, providing a RAM based memory system with waveform information, and generating the waveform from sequential memory from a combination of the waveform information in the RAM based memory system from a first memory site to a memory site dependent on the segment RAM depth. The generated waveform is filtered to obtain only the waveform at the desired frequency. The RAM based memory system is provided with the waveform information by dividing each desired waveform into segments depending on the clock value and storing each of the segments in a respective memory site.

In the method for evaluating an analog to digital converter, the generated waveform which includes the desired frequency and a frequency of a clock rate adjusted by the desired frequency is directed to a filter to remove the frequency of the clock rate adjusted by the desired frequency to thereby obtain only the desired frequency which is directed to the analog to digital converter. The generated waveform is tuned in the filter to a center frequency if it is a sinewave or a tuned squarewave.

BRIEF DESCRIPTION OF THE DRAWINGS

A more complete appreciation of the present invention and many of the attendant advantages thereof will be readily understood by reference to the following detailed description of the invention when considered in connection with the accompanying drawings in which.

DETAILED DESCRIPTION OF THE PREFERRED EMBODIMENTS

Figure 1:
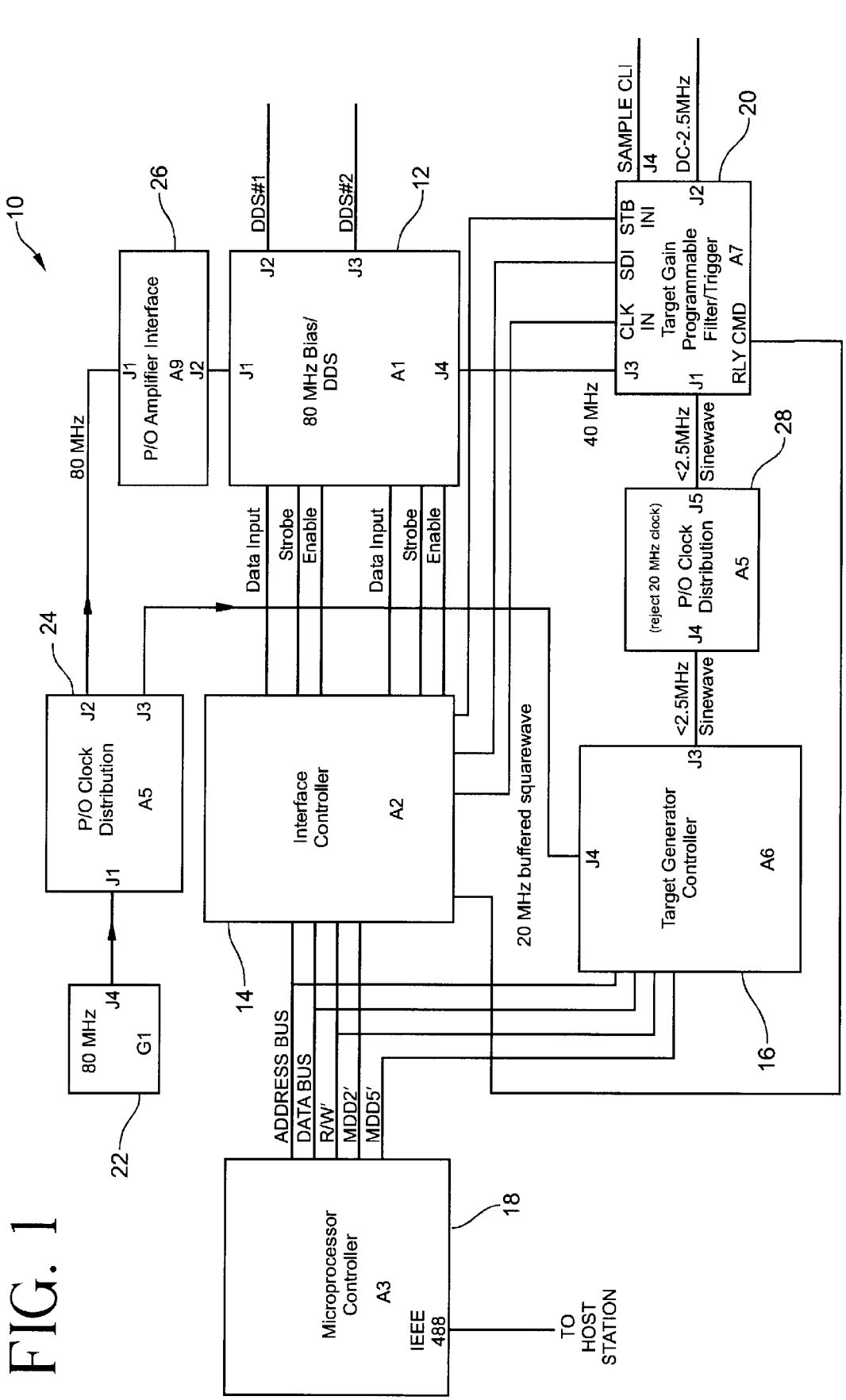
FIG. 1 shows the components of the digital data processing module in accordance with the invention.

Referring to the accompanying drawings wherein like reference numerals refer to the same or similar elements throughout the several views, FIG. 1 shows the general arrangement and common elements of the digital data processor in accordance with the invention which is designated 10. The digital data processor 10 is electrically connected to the host computer (not shown) of the automatic test equipment through all IEEE488 which is thus the interface between the digital data processor 10 and the host computer. The IEEE488 is a specific type of data bus interface utilized in processor based electronic systems. It is conceivable that other common or standard bus interfaces and protocols such as RS-232, RS-422, Ethernet, MIL-STD-1553 and others, as well as proprietary bus protocols, can be used in accordance with the invention. The digital data processor 10 includes an 80 MHz Bias/DDS (direct digital synthesizer) 12, an interface controller 14 and a target generator controller 16 and memory mapped into the memory space of the microprocessor controller 18. Other command and control steps for the direct digital synthesizer 12 and a target gain programmable filter/trigger 20 are derived on the interface controller 14.

The direct digital synthesizer 12 is a circuit which provides at least two (2) independently programmable stable, low noise sinusoidal output signals DDS#1, DDS#2. These signals may be phase or frequency modulated as linear FM, sine modulated FM, or hopped. Phase modulations may be linear in ninety (90) degree steps or may be randomly set.

The interface controller 14 is connected to the direct digital synthesizer 12 and provides bidirectional control and registry for all non-memory mapped circuit card assemblies (CCA's). It also provides for the functional evaluation of the CCA of the target generator controller 16 and the instrument control logic.

The digital data processor 10 also includes an 80 MHz oven controlled crystal oscillator 22 (a subassembly) integrally coupled to the direct digital synthesizer 12 (a CCA). These integral subassembly and CCA respectively function to provide fine tune low noise, low spurious synthesis and clock generation. Full synchronous operation of the two DDS circuits, clock, trigger and target generator are all available as coherent waveforms.

The oven controlled crystal oscillator constitutes a reference frequency source. Although such reference frequency sources include a so-called temperature compensated crystal oscillator (TCXO) for the accuracy of measurement up to +0.1 ppm, the so-called oven-controlled highly stabilized crystal oscillator (OCXO) is preferably used to obtain a higher accuracy. Such an oscillator is manufactured as an oscillator unit by those skilled in the art and satisfies requirements for the reference frequency source as its unit.

An example of a conventional OCXO (oven-controlled highly stabilized crystal oscillator) which can be used in the invention is shown in FIG. 11 of U.S. Pat. No. 5,719,782 (Mitsuoka). As shown in FIG. 11 of this patent, reference numeral 201 is an oven control unit by which a regulated temperature oven 202 is controlled in its temperature to a regulated predetermined temperature. The regulated temperature oven 202 contains part or the whole of an oscillator output unit 203, a crystal oscillator 204, a frequency adjustment unit 205, and part or the whole of a frequency varying unit 206, all of these units constituting an oscillation loop. One circuit may commonly use part or the whole of the frequency adjustment unit 205 and the frequency varying unit 206. The regulated temperature oven control unit generally keeps accurately and with high stability regulated temperature oven internal temperature at a minimum point temperature of a frequency-temperature characteristic of a crystal oscillator used in the present oscillator, i.e., a turning point temperature on the high temperature side when the characteristic is a cubic curve. The oscillation/output unit 203 supplies a crystal oscillator with energy required for the crystal oscillator to vibrate in a predetermined mode and outputs oscillation frequency of the crystal oscillator to the outside. For the crystal oscillator 204, there are used those having high stability and less variations with the lapse of time, and the crystal oscillator 204 is designed and manufactured such that the minimum point temperature of the frequency-temperature, characteristic falls within a predetermined temperature range. The frequency adjustment unit 205 is a circuit for adjusting a variation amount by the frequency varying unit 206 such that an oscillator output at the state of zero of the variation amount falls within a predetermined deviation with respect to a nominal frequency of the oscillation frequency for the purpose of correction of manufacturing deviation of the foregoing crystal oscillator and other circuit components. The frequency varying unit 206 is a circuit for correcting the change with the lapse of time of the crystal oscillator, for which a variable width is typically required. The nominal frequency is a reference absolute frequency to be output from the oscillator, i.e., an ideal value for which a certain allowable error range is specified to actual oscillators.

Another oven controlled crystal oscillator that might be used in the invention is of the type constructed in accordance with the teachings of U.S. Pat. No. 5,530,408 (Vig et al.). Vig et al. teaches oven controlled oscillators having improved frequency vs. temperature stability and thus would be particularly useful in the invention. Misuoka and Vig et al. are incorporated by reference herein in their entirety.

A clock distributor 24 is coupled to the oven controlled crystal oscillator (OCXO) 22 and receives the reference frequency signal therefrom. The clock distributor 24 provides two identical signals, one to the amplifier interface 26 and one to the target generator controller 16. Amplifier interface 26 provides for the amplification of the analog signals and may be a linear amplification circuit.

The target generator controller 16 includes a circuit card assembly which provides two (2) uniquely designed electrically programmed logic devices (EPLD's) to support memory synthesizer, clock rate and DAC (digital to analog conversion) control. Functionally, it allows for waveform generation including pulse, triangle, user defined and extremely pure sinusoidal waveforms. An EPLD is a multiple signal path processing circuit that does not require the use of software. Other comparable circuits could also be used in accordance with the invention.

The target gain programmable filter/trigger 20 is coupled to the direct digital synthesizer 12, interface controller 14 and a clock distributor 28. The circuit card assembly of the filter/trigger 20 provides the necessary band-pass and pre-selective filtering to ensure that the sinusoidal waveforms are pure or that the necessary gain for all waveforms is provided.

In the invention, specific and unique waveform software and spectrally pure waveform generation algorithms are utilized. Such algorithms are specifically designed to take full advantage of the instrument hardware and allow digitally tuned and generated waveforms to be output as spectrally pure signals when high spectral purity is required (obviously this is true for sinusoidal waveforms only).

Figure 2:
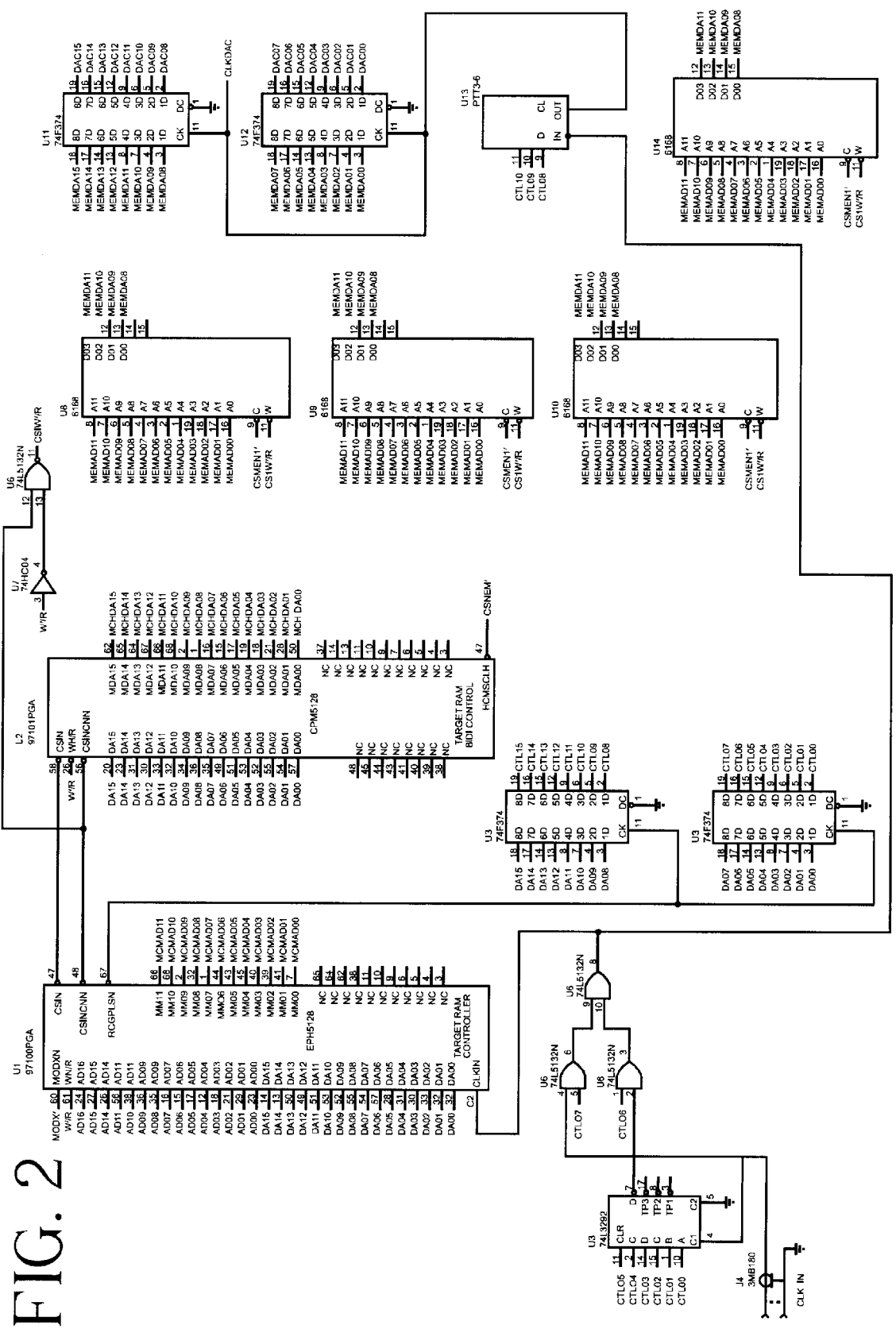
FIG. 2 is a schematic diagram of the target generator circuit on the target generator controller.
Figure 2A:
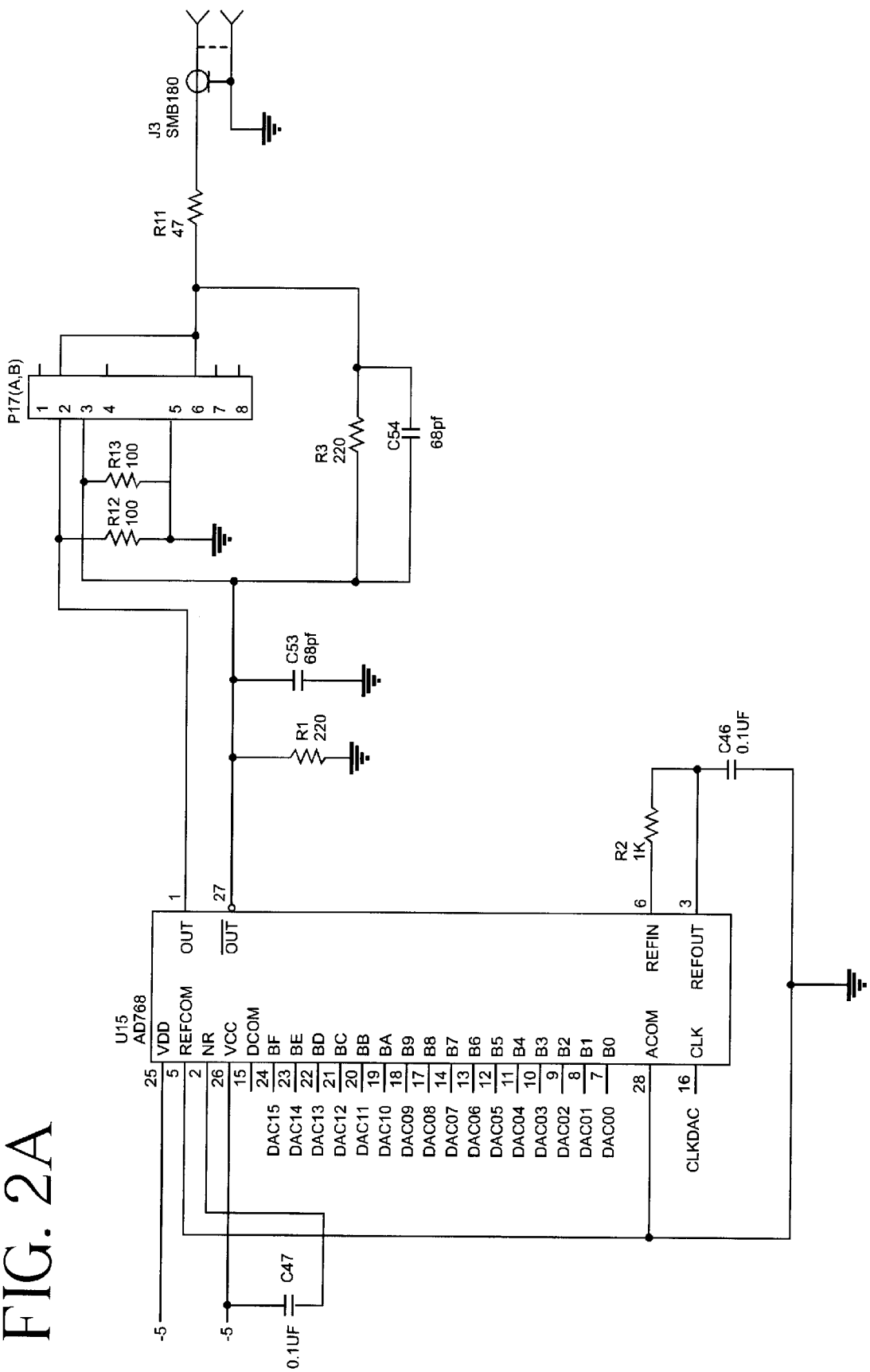
Figure 3:
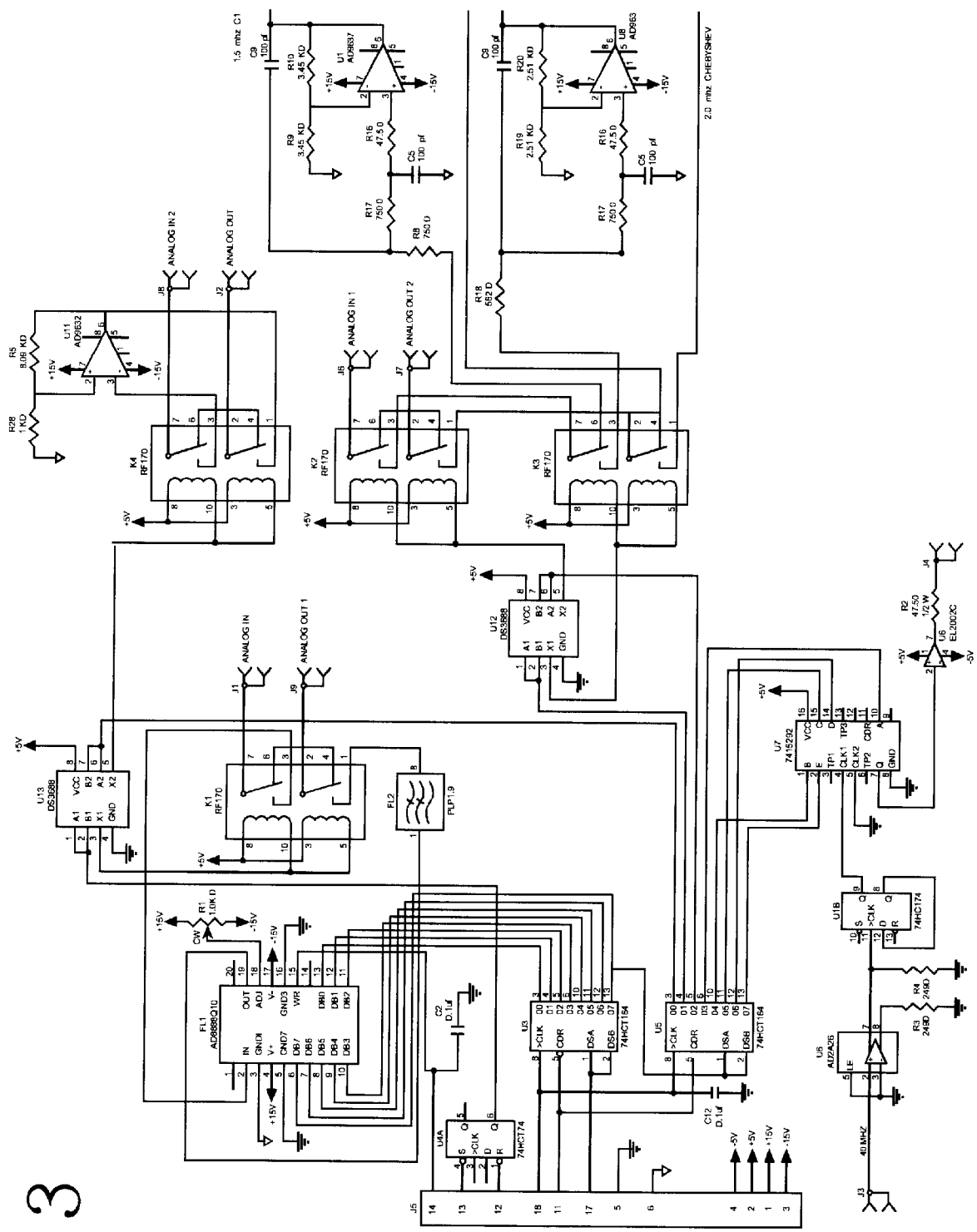
FIG. 3 is a schematic diagram of the programmable filter in the target gain programmable filter/trigger.

In this regard, the schematic diagrams of FIGS. 2 and 3 depict the hardware implemented to generate pure sinusoidal waveforms. The algorithms required are straightforward and are discussed herein as part of the description of the waveform generation system. The target generator controller 16 is an integration of digital EPLD'S, digital surface mount MSI and a high speed, low distortion, high linearity 16 Bit BiCMOS Digital to Analog Converter (DAC). Normally, when generating waveforms, digitally, spurious noise is a function of the phase and amplitude accuracy of each segment generated. In this system, sixteen (16) bits are utilized to reduce spurious noise to a theoretical level (96 dBc). Since the digital implementation consists of downloading a high speed RAM based memory system with waveform information, and since the address counters are synchronously implemented, a waveform with a constant offset phase is created. Since the clock is an extremely stable oven controlled crystal oscillator 22, the waveforms generated are spectrally pure. Harmonics at levels up to about 80 dBc have been observed without additional filtering. Upon implementing a pre-selector at the output of this BiCMOS DAC, spectrally pure output signals are achieved in the range of DC-2 MHz.

The algorithms controlling frequency are best fit implemented. Since the memory is 4K×116 Bits and its representative address counters are 12 bits wide or 4096 address locations in length, the following software techniques are applied. In the event that the waveform desired is 1.5 MHz, the following mathematically developed memory download is performed:

(a) at the maximum clock rate of 20 MHz (50 nanoseconds)–1.5 MHz translates to nominally 667 nanoseconds which requires 667/50=13 memory locations (0–12) depicting a sine-wave, (b) 360°/13=28° per discrete segment or sin(n*28°), and (c) the end address comparator is set to address 12 which is the recycle address.

Since the memory receives a download of 13 memory locations from 0 through 12 with discrete segment representations of sin(n*28°), an output waveform depicting 13 discrete steps through 360 degrees is output and continuously cycled. The spectrum of a signal of this nature contains the fundamental of. (1/667 nanoseconds=1.49925 MHz) and 20 MHz+{m(1.49925 MHz)} and 20 MHz–{m(1.49925 MHz)}. This clock and its sidebands are removed from the output spectrum by tunable band-pass filtering in the circuit card assembly in the target gain programmable filter/trigger 20. The result is a pure 1.49925 MHz sinusoidal tone for evaluating high dynamic range ADC devices found for example in electronic systems.

In the event that the waveform desired is 3.0 MHz, the following mathematically developed memory download is performed:

(a) at the maximum clock rate of 20 MHz (50 nanoseconds)–3.0 MHz translates to nominally 333 nanoseconds which requires 333/50=7 memory locations (0–6) depicting a sinewave,
(b) 360°/7=52° per discrete segment or sin(n*52°), and
(c) the end address comparator is set to address 6 which is the recycle address.

Since the memory receives a download of 7 memory locations from 0 through 6 with discrete segment representations of sin(n*52°), an output waveform depicting 7 discrete steps through 360 degrees is output and continuously cycled. The spectrum of a signal of this nature contains the fundamental of. (1/333 nanoseconds=3.0030 MHz) and 20 MHz+{m(3.0030 MHz)} and 20 MHz−{m(3.0030 MHz)}. This clock and its sidebands are removed from the output spectrum by tunable band-pass filtering in the circuit card assembly in the target gain programmable filter/trigger 20. The result is a pure 3.0030 MHz sinusoidal tone.

The algorithm's design is such that 4K of memory is exhausted at the highest clock rate if the frequency required supports this implementation. Upon being required to generate a waveform whose frequency does not meet this specification, the algorithm automatically divides the clock from $2^2$ to $2^{32}$ depending on the frequency required. The algorithm also scans the program variable field for waveform type and loads the type of waveform into the memory that is desired. These waveforms include triangle, pulse, or user loaded. Clock rates, segment number are all automatically generated as a best fit according to the description shown above. For example, a 550 kHz pulse waveform with a 10% duty cycle is generated via the algorithm determining best fit for 550 kHz, to include clock rate, number of segments of maximum amplitude and number of segments of zero amplitude. Here 550 kHz=1.818 micro-seconds. At 1.818 microseconds, a waveform consisting of 1.818/0.05= 36 segments will be generated of which 10% or 4 segments will contain maximum amplitude and 32 will contain zero amplitude. This waveform will be recycled repetitively until a new waveform or a reset command is received.

As another example, a 400 kHz pulse waveform with a 10% duty cycle is generated via the algorithm determining best fit for 400 kHz, to include clock rate, number of segments of maximum amplitude and number of segments of zero amplitude. 400 kHz=2.5 micro-seconds. At 2.5 microseconds, a waveform consisting of 2.5/0.05=50 segments will be generated of which 10% or 5 segments will contain maximum amplitude and 45 will contain zero amplitude.

The circuit card assembly (CCA) of the target gain programmable filter/trigger 20 contains two (2) independently flnctioning circuits which allow for coherent triggering of other automatic test system assets while producing a coherent waveform.

The trigger rate is controlled by programming and is selected by the user. This circuit utilizes an input clock of 40 MHz and divides this clock utilizing an MSI programmable digital timer. Its output is buffered via a high-speed video back-matched driver. The programmable pre-selecting filter is a digitally programmed from dc to 4 MHz. This filter is an integration of surface mounted components packaged in a hybrid package. Its frequency response follows a Chebyshev characteristic and provides a minimum of 62 dBc rejection at one octave from the programmed frequency. This device is an eight (8) bit tunable device which is extremely linear and follows the function $f_{tune}$=([Programmed Value]/255)*1 MHz. This provides a minimum frequency resolution of 4 kHz per bit which is more than sufficient to support the best fit waveforms being generated.

Figure 4:
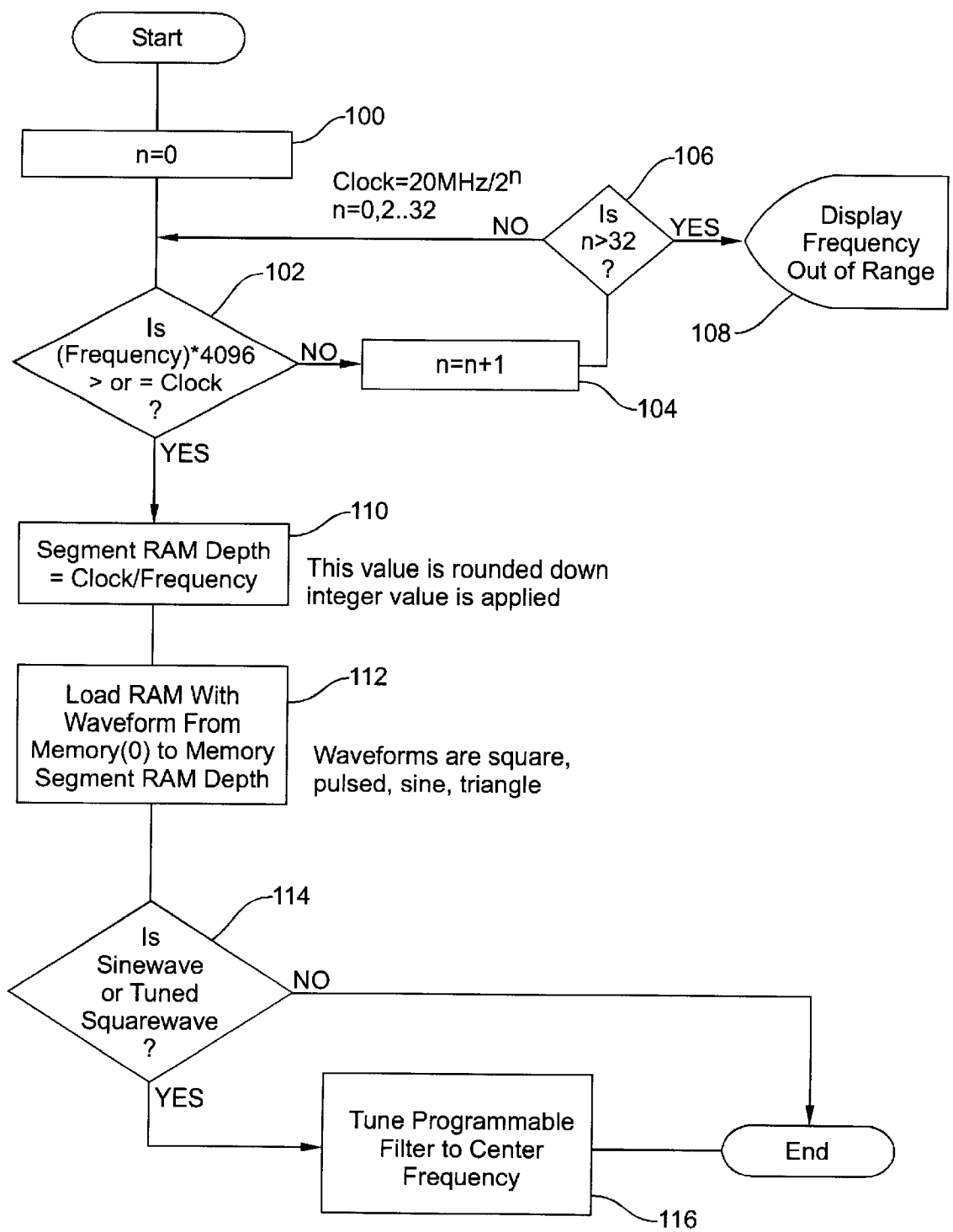
FIG. 4 is a flow chart showing the manner in which waveforms are generated in accordance with the invention.

Referring now to the flow chart of the algorithm shown in FIG. 4, since the low noise, low spurious target generator is predominantly digital in design, all waveforms are generated through the algorithm maximizing signal frequency, signal integrity and minimizing memory usage. The algorithm is started by assigning a value of 0 to the designator "n" at block 100. At block 102, a determination is made whether the frequency *4096 is greater than or equal or the clock (20 MHz/$2^n$). If not, then n is incremented by 1 at block 104, a determination is made whether n is greater than 32 at block 106 and if n>32, the indication of the frequency being out of range is indicated schematically by block 108. If not, the clock value is adjusted in view of the change to n and the algorithm returns to block 104 for the determination of whether the frequency *4096 is greater than or equal to the clock. Once the frequency *4096 is less than or equal to the clock, a segment RAM depth is assigned to be equal to the clock/frequency and this value is rounded down to the nearest integer at block 110. The RAM is then loaded with the waveform from memory(0) to memory (Segment RAM depth) at block 112. The waveforms may be, e.g., square waveforms, pulsed waveforms, sine waveforms and triangle waveforns. At block 114, a determination is made whether the waveform is a sinewave or tuned squarewave. If not, the algorithm ends. If so, the programmable filter 20 is tuned to the center frequency (represented by block 116).

The foregoing algorithm is an exemplifying algorithm which allows for integral digital segments to generate waveforms thereby guaranteeing that no random phase modulations occur as an outgrowth of phase accumulator overflow which usually occurs in conventional DDS technologies. The sixteen (16) bit highly linear ADC in this design supports a low spurious spectrum integrity and the highly stable, low spurious, low noise 80 MHz crystal oscillator guarantee an extremely low noise floor and stable output functions.

Figure 5:
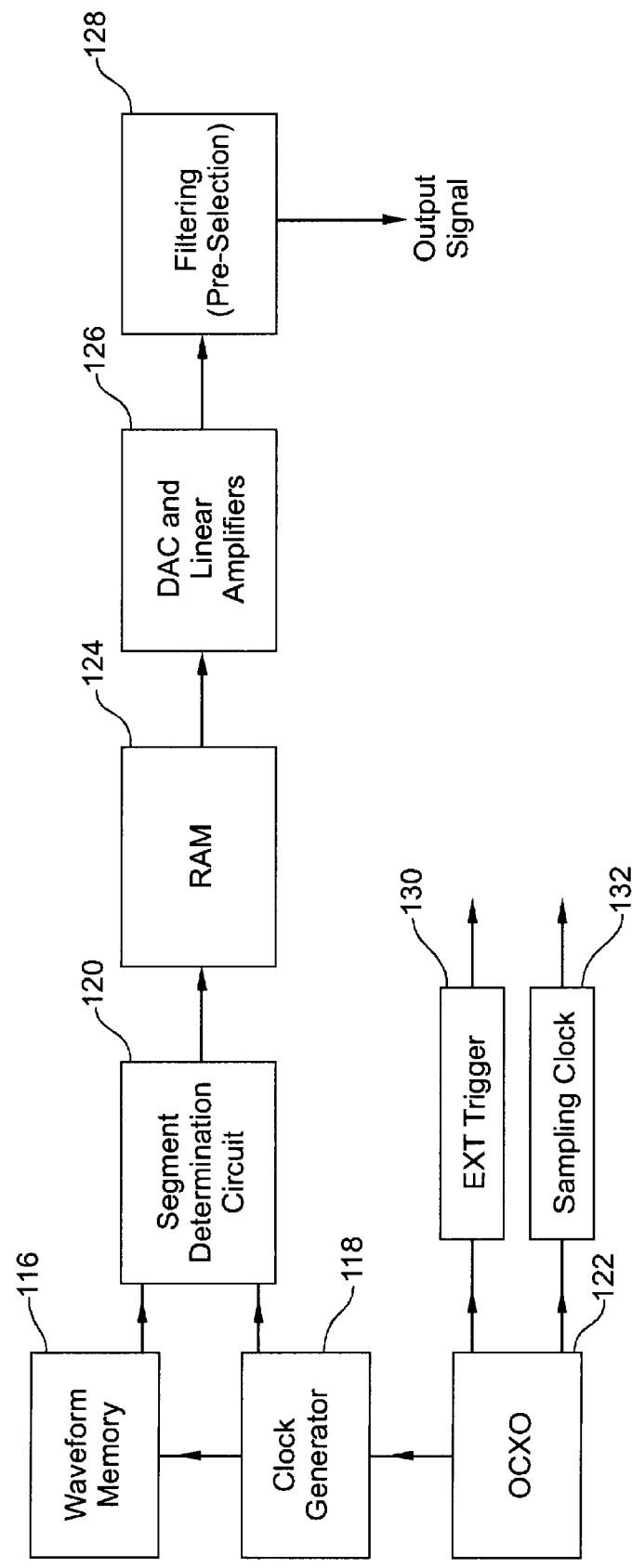
FIG. 5 is a schematic illustration of the invention.

FIG. 5 shows a schematic illustration of the invention. The oven controlled crystal oscillator 122 generates a reference frequency signal and directs this signal to the clock generator 118, external trigger 130 and sampling clock 132. The clock generator 118 provides a signal for use as a timing basis. From the clock generator 118, a signal is sent to the waveform memory 116 and to the segment determination circuit 120. These could both be resident in the target generator controller 16 (see FIG. 1). Waveform memory 116 contains data on different types of waveforms that can be generated using the invention, e.g., sine waves, square waves, etc. One manner in which the segments of sine and square waveforms are determined is discussed above and is also shown in FIG. 4. The segment determination circuit 118 thus considers the desired frequency of the output signal and desired waveform and determines how to segment the waveform and passes segments of the waveform to the specific addresses of the RAM memory 124. The DAC 126 operationally downloads the RAM memory 124, i.e., the waveform segments in sequence, in order to obtain the digital signals representative of the waveform segments. It converts these digital signals synchronously into analog signals. Associated with the DAC 126 are linear amplifiers which amplify the analog signals. The analog signals are sent from the DAC 126 to the filtering component(s) 128, e.g., band-pass and/or pre-selective filtering, to eliminate any sidebands and thereby obtain a signal having only the desired frequency.

The combination of the use of the oven controlled oscillator 122, a high speed/high resolution DAC and linear amplifiers 126 and filtering components 128 in the manner described above results in very low noise, low spurious, spectrally pure output signals. Optimally, all of these components would thus be present in a device for generating signals. Dispensing with one of these components, if possible, or substituting another component or other components of inferior operability or different construction could diminish the quality of the signals generated. Nevertheless, the presence of all of these components exactly as described above and shown in the drawings is not essential to achieve some or all of the advantages of the invention, and the substitution of other comparable components is within the purview of the invention. Also, it is important to note the absence of a phase accumulator. In a significant number of prior art signal generating devices, a phase accumulator is necessary in order to generate the desired waveform. The present invention avoids the use a phase accumulator and any associated drawbacks and disadvantages.

The examples provided above are not meant to be exclusive. Many other variations of the present invention would be obvious to those skilled in the art, and are contemplated to be within the scope of the appended claims.

I claim:

1. A device for generating a spectrally pure waveform of a desired frequency, comprising:
    an oven controlled crystal oscillator for generating a reference frequency signal,
    a waveform memory containing data on the waveform,
    a segment determination circuit coupled to said waveform memory for creating segments of the waveform in said waveform memory based on the reference frequency signal and the desired frequency,
    a programmable memory coupled to said segment determination circuit for receiving and storing said segments of the waveform in dedicated address memories,
    a digital-to-analog converter coupled to said programmable memory for downloading the address memories of said programmable memory and forming analog signals, and
    a filtering component for filtering the analog signals to obtain the waveform of the desired frequency.

2. The device of claim 1, further comprising a clock generator/distributor interposed between said oscillator and said waveform memory and segment determination circuit.

3. The device of claim 1, further comprising an amplifier associated with said digital-to-analog converter for amplifying the analog signals.

4. The device of claim 1, further comprising a linear amplification circuit arranged in association with said digital-to-analog converter for amplifying the analog signals.

5. The device of claim 1, wherein said filtering component includes a band-pass filter.

6. The device of claim 1, wherein said filtering component includes a pre-selector.

7. The device of claim 1, wherein said waveform memory includes data on sine waves, square waves and triangle waves.

8. The device of claim 1, wherein said digital-to-analog converter is a 16 bit BiCMOS.

9. The device of claim 1, wherein said programmable memory is a RAM memory.

10. The device of claim 1, wherein said segment determination circuit includes at least one electrically programmed logic device capable of supporting control over memory synthesis, clock rate and said digital-to-analog converter.

11. A method for generating a waveform at a particular frequency, comprising the steps of:
    providing a register (n) having a value of 0 and clock value of 20 MHz/$2^n$,
    determining whether the frequency times 4096 is greater than or equal to the clock value,
    incrementing the register (n) until the frequency times 4096 is greater than or equal to the clock value, then
    assigning a segment RAM depth to be equal to the nearest, lower integer of the clock value or frequency,
    providing a RAM based memory system with waveform information,
    generating the waveform from sequential memory from a combination of the waveform information in the RAM based memory system from a first memory site to a memory site dependent on the segment RAM depth, and,
    filtering the generated waveform to obtain only the waveform at the desired frequency.

12. The method of claim 11, further comprising the step of:
    indicating that the frequency is out of range if the register is greater than 32.

13. The method of claim 11, wherein the step of providing a RAM based memory system with waveform information comprises the step of dividing each desired waveform into segments depending on the clock value and storing each of the segments in a respective memory site.

14. A method for evaluating an analog to digital converter, comprising the steps of:
    providing a register (n) having a value of 0 and clock value of 20 MHz/$2^n$,
    determining whether the frequency times 4096 is greater than or equal to the clock value,
    incrementing the register (n) until the frequency times 4096 is greater than or equal to the clock value, then
    assigning a segment RAM depth to be equal to the nearest, lower integer of the clock value or frequency,
    providing a RAM based memory system with waveform information,
    generating the waveform from sequential memory from a combination of the waveform information in the RAM based memory system from a first memory site to a memory site dependent on the segment RAM depth; the generated waveform including the desired frequency and a frequency of a clock rate adjusted by the desired frequency, and
    directing the waveform to a filter to remove the frequency of the clock rate adjusted by the desired frequency to thereby obtain only the desired frequency which is directed to the analog to digital converter.

15. The method of claim 14, further comprising the step of:
    tuning the generated waveform in the filter to a center frequency when the generated waveform is a sinewave or a tuned squarewave.

16. The method of claim 14, further comprising the step of:
    indicating that the frequency is out of range if the register is greater than 32.

17. The method of claim 14, wherein the step of providing a RAM based memory system with waveform information comprises the step of dividing each desired waveform into segments depending on the clock value and storing each of the segments in a respective memory site.

18. A method for generating a waveform at a particular frequency, comprising the steps of providing a register (n) having a value of 0 and a predetermined clock value of a clock frequency divided by $2^n$, determining whether the frequency times a memory capacity in bytes of a RAM-based memory system is greater than or equal to the clock value, incrementing the register (n) until the frequency times the memory capacity in bytes of the RAM-based memory system is greater than or equal to the clock value, then assigning a segment RAM depth to be equal to the nearest, lower integer of the clock value or frequency, providing the RAM-based memory system with waveform information, generating the waveform from sequential memory from a combination of the waveform information in the RAM-based memory system from a first memory site to a memory site dependent on the segment RAM depth, and filtering the generated waveform to obtain only the waveform at the desired frequency.

19. The method of claim 18, wherein the clock frequency is 20 MHz and the memory capacity in bytes of the RAM-based memory system is 4096 bytes.

20. The method of claim 18, wherein the step of providing the RAM-based memory system with waveform information comprises the step of dividing each desired waveform into segments depending on the clock frequency and segment RAM depth and storing each of the segments in a respective memory site.

21. A method for evaluating an analog to digital converter, comprising the steps of:

providing a register (n) having a value of 0 and a predetermined clock value of a clock frequency divided by $2^n$, determining whether the frequency times a memory capacity in bytes of a RAM-based memory system is greater than or equal to the clock value, incrementing the register (n) until the frequency times the memory capacity in bytes of the RAM-based memory system is greater than or equal to the clock value, then assigning a segment RAM depth to be equal to the nearest, lower integer of the clock value or frequency, providing the RAM-based memory system with waveform information, generating the waveform from sequential memory from a combination of the waveform information in the RAM-based memory system from a first memory site to a memory site dependent on the segment RAM depth; the generated waveform including the desired frequency and a frequency of a clock rate adjusted by the desired frequency, and directing the waveform to a filter to remove the frequency of the clock rate adjusted by the desired frequency to thereby obtain only the desired frequency which is directed to the analog to digital converter.

22. The method of claim 21, wherein the clock frequency is 20 MHz and the memory capacity in bytes of the RAM-based memory system is 4096 bytes.

23. The method of claim 21, further comprising the step of:

tuning the generated waveform in the filter to a center frequency when the generated waveform is a sine wave or a tuned square wave.

24. The method of claim 21, wherein the step of providing a RAM-based memory system with waveform information comprises the step of dividing each desired waveform into segments depending on the clock value and the segment RAM depth and storing each of the segments in a respective memory site.

25. A method for generating a spectrally pure waveform of a desired frequency, comprising the steps of:

generating a reference frequency signal by means of an oven controlled oscillator, creating segments of the waveform based on the reference frequency signal and the desired frequency, storing the segments of the waveform in dedicated address memories, forming analog signals by downloading the address memories, and filtering the analog signals to obtain the waveform of the desired frequency.

26. The method of claim 25, wherein the step of creating the segments of the waveform comprises the steps of providing a register (n) having a value of 0 and a predetermined clock value of a clock frequency divided by $2^n$, determining whether the frequency times the memory capacity in bytes of a RAM-based memory system is greater than or equal to the clock value, incrementing the register (n) until the frequency times the memory capacity in bytes of the RAM-based memory system is greater than or equal to the clock value, then assigning a segment RAM depth to be equal to the nearest, lower integer of the clock value or frequency, and then dividing the waveform into segments based on the segment RAM depth with each waveform segment being stored in a respective one of the dedicated address memories in the RAM-based memory system from a first address memory to an address memory dependent on the segment RAM depth.

\* \* \* \* \*